(12) United States Patent
Arthur et al.

(10) Patent No.: US 6,521,724 B2
(45) Date of Patent: Feb. 18, 2003

(54) POLYMERIZATION PROCESS

(75) Inventors: Samuel David Arthur, Wilmington, DE (US); Mark F. Teasley, Landenberg, PA (US); Dewey Lynn Kerbow, Landenberg, PA (US); Ofelia Fusco, Ferrara (IT); Tiziano Dall 'Occo, Ferrara (IT); Giampiero Morini, Padova (IT)

(73) Assignees: E. I. du Pont de Nemours and Company, Wilmington, DE (US); Basell Technology Company B.V., Hoofddorp (NL)

( * ) Notice: Subject to any disclaimer, the term of this patent is extended or adjusted under 35 U.S.C. 154(b) by 0 days.

(21) Appl. No.: 09/801,033

(22) Filed: Mar. 7, 2001

(65) Prior Publication Data

US 2001/0044510 A1 Nov. 22, 2001

Related U.S. Application Data

(60) Provisional application No. 60/188,660, filed on Mar. 10, 2000.

(51) Int. Cl.$^7$ ............................... C08F 2/00; C08F 4/44
(52) U.S. Cl. ................... 526/89; 526/154; 526/161; 526/172; 526/348.6; 526/352; 502/155; 502/162
(58) Field of Search ............... 526/89, 161, 172, 526/154, 352, 348.6; 502/155, 162

(56) References Cited

U.S. PATENT DOCUMENTS

| | | |
|---|---|---|
| 4,054,612 A | 10/1977 | Yagi et al. |
| 4,710,552 A | 12/1987 | Bachl et al. |
| 5,110,928 A | 5/1992 | Schroeder et al. |
| 5,210,160 A | 5/1993 | Saive et al. |
| 5,714,556 A | 2/1998 | Johnson et al. |
| 5,852,145 A | 12/1998 | McLain et al. |
| 5,880,241 A | 3/1999 | Brookhart et al. |
| 5,929,181 A | 7/1999 | Makovetsky et al. |
| 5,932,670 A | 8/1999 | Koppl et al. |
| 5,942,461 A | 8/1999 | Brown et al. |
| 5,955,555 A | 9/1999 | Bennett |
| 6,060,569 A | 5/2000 | Bennett et al. |
| 6,103,658 A | 8/2000 | MacKenzie et al. |
| 6,174,975 B1 | 1/2001 | Johnson et al. |
| 6,310,149 B1 * | 10/2001 | Haddleton .............. 526/89 |

FOREIGN PATENT DOCUMENTS

| | | |
|---|---|---|
| DE | 19920553 | 9/1999 |
| EP | 0893455 | 1/1999 |
| EP | 0924223 | 6/1999 |
| JP | 09255712 | 4/1999 |
| JP | 09255713 | 4/1999 |
| JP | 11158213 | 1/2000 |
| JP | 11209426 | 2/2000 |
| JP | 11180991 | 1/2001 |
| WO | WO96/37522 | 11/1996 |
| WO | WO96/23492 | 7/1997 |
| WO | WO97/48735 | 12/1997 |
| WO | WO98/37110 | 6/1998 |
| WO | WO98/30612 | 7/1998 |
| WO | WO98/38228 | 9/1998 |
| WO | WO98/40420 | 9/1998 |
| WO | WO98/42664 | 10/1998 |
| WO | WO98/42665 | 10/1998 |
| WO | WO98/47934 | 10/1998 |
| WO | WO99/51550 | 10/1998 |
| WO | WO98/56837 | 12/1998 |
| WO | WO99/41290 | 9/1999 |
| WO | WO99/49969 | 10/1999 |
| WO | WO00/06620 | 2/2000 |
| WO | WO 00/50470 * | 8/2000 |
| WO | WO00/53646 | 9/2000 |
| WO | WO01/10876 | 2/2001 |

OTHER PUBLICATIONS

Beck, W. et al., Chem. Rev., 1988, p. 1405–1421, vol. 88.
Strauss, S. H., Chem. Rev., 1993, p. 927–942, vol. 93.

* cited by examiner

*Primary Examiner*—David W. Wu
*Assistant Examiner*—R. Harlan

(57) ABSTRACT

Processes for the polymerization of olefins in which late transition metal complexes, such as nickel, iron, cobalt and palladium complexes, are used as a polymerization catalyst have improved polymer productivity when oxidizing agents are present during at least a portion of the polymerization. The polymers produced are useful as elastomers, for packaging films, and molding resins.

38 Claims, No Drawings

POLYMERIZATION PROCESS

CROSS-REFERENCE TO RELATED APPLICATION

This application claims priority under 35 U.S.C. §119 from U.S. Provisional Application Ser. No. 60/188,660 (filed Mar. 10, 2000), which is incorporated by reference herein for all purposes as if fully set forth.

FIELD OF THE INVENTION

Processes for the polymerization of olefins in which late transition metal complexes, such as nickel, iron, cobalt and palladium complexes, are used as a polymerization catalyst have improved polymer productivity when an oxidizing agent is present during at least a portion of the polymerization.

TECHNICAL BACKGROUND

Polyolefins, such as polyethylene and polypropylene, are important items of commerce, and many methods have been developed for their production. Commonly a transition metal compound is used as a polymerization catalyst, and recently there has been great interest on the use of late transition metal complexes (Group 8 to Group 10 metals, IUPAC designation) as such polymerization catalysts. While some of these catalysts display excellent productivity of polymer (amount of polymer produced per unit of catalyst) in various types (homogeneous, slurry and gas phase for instance) of polymerization processes, others display relatively low productivity and/or the lifetime of the active catalyst is shorter than that desired in a typical commercial polymerization process.

The cause of these shortcomings for those polymerization catalysts has not been clear, so it has been difficult to rectify them. Generally speaking, while varying polymerization conditions such as temperature, pressure of monomer (if it is a gas), concentration of polymerization catalyst, variation of cocatalyst (such as alkylaluminum compounds), etc., can result in modest improvements in polymer productivity in some instances, often a desired level of productivity is not reached. Therefore methods of making these types of polymerizations more productive are being sought.

U.S. Pat. Nos. 4,710,552, 5,110,928 and 5,210,160 report the use of various halogenated compounds as additives in the polymerization of olefins using Ziegler early transition metal polymerization catalysts, principally to improve the processability of the polyolefins produced. No mention is made of late transition metal catalysts.

WO00/50470 mentions in Example 148 the use of ethyl phenyldichloroacetate in combination with a certain iron containing catalyst in the polymerization of ethylene. There is no mention of any improvement in polymer productivity because of use of the ester.

SUMMARY OF THE INVENTION

This invention concerns a process for the polymerization of an olefin, comprising the step of contacting, under polymerization conditions, said olefin with an olefin coordination polymerization catalyst comprising a complex of a Group 8 to Group 10 metal, wherein an oxidizing agent is present during at least a portion of said contacting.

This invention also concerns an improved process for the polymerization of an olefin in which said olefin is contacted, under polymerization conditions, with an olefin co-ordination polymerization catalyst comprising a complex of a Group 8 through a Group 10 metal, wherein the improvement comprises that an oxidizing agent is present during at least a portion of the contacting of said polymerization catalyst and said olefin.

This invention also concerns a process for improving the productivity of an olefin coordination polymerization catalyst comprising a complex of a Group 8 to Group 10 metal, in a process for producing a polyolefin by contacting an olefin with said polymerization catalyst under conditions to polymerize said olefin, said process comprising the step having an oxidizing agent present during at least a portion of the contacting of said olefin and said polymerization catalyst.

DETAILED DESCRIPTION OF THE PREFERRED EMBODIMENTS

In the polymerization processes and catalyst compositions described herein, certain groups may be present.

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups herein contain 1 to about 30 carbon atoms.

By "saturated" hydrocarbyl is meant a univalent radical that contains only carbon and hydrogen, and contains no carbon-carbon double bonds, triple bonds or aromatic groups.

By "substituted hydrocarbyl" herein is meant a hydrocarbyl group that contains one or more (types of) substituents that do not substantially interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents when present are halo, ester, amino, imino, carboxyl, phosphite, phosphonite, phosphine, phosphinite, thioether, and amide. Which substituents are useful in which polymerizations may in some cases be determined by reference to U.S. Pat. No. 5,880,241 (incorporated by reference herein for all purposes as if fully set forth). If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(substituted) hydrocarbylene" is meant a group analogous to hydrocarbyl, except the radical is divalent.

"Alkyl group" and "substituted alkyl group" have their usual meaning (see above for substituted under substituted hydrocarbyl). Unless otherwise stated, alkyl groups and substituted alkyl groups preferably have 1 to about 30 carbon atoms.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

By "phenyl" is meant the C6H5- radical, and a phenyl moiety or substituted phenyl is a radical in which one or more of the hydrogen atoms is replaced by a substituent group (which may include hydrocarbyl). Preferred substituents for substituted aryl include those listed above for substituted hydrocarbyl, plus hydrocarbyl.

By "(inert) functional group" herein is meant a group other than hydrocarbyl or substituted hydrocarbyl that is inert under the process conditions to which the compound containing the group is subjected. The functional groups also do not substantially interfere with any process described herein that the compound in which they are present may take part in. Examples of functional groups include some halo groups (for example fluoro and some unactivated chloro) ether such as —OR$^{31}$ wherein R$^{31}$ is hydrocarbyl or substituted hydrocarbyl. In cases in which the functional group may be near a metal atom, the functional group should not coordinate to the metal atom more strongly than the groups in those compounds are shown as coordinating to the metal atom, that is they should not displace the desired coordinating group.

By an "active halocarbon" is meant a compound that contains carbon and halogen, and optionally hydrogen, and may contain inert functional groups (other than halogen) and, preferably when present in the polymerization process, increases the productivity of the polymerization catalyst by at least 10 percent, based on a similar polymerization without the active halocarbon present.

By a "neutral bidentate ligand" is meant a bidentate ligand that no charge on the ligand (is not ionic in a formal sense if not coordinated to the transition metal).

By a "neutral tridentate ligand" is meant a tridentate ligand that has no charge on the ligand.

By a "neutral monodentate ligand" is meant a monodentate ligand that no charge on the ligand.

By an "monoanionic bidentate ligand" is meant a bidentate ligand that has one negative charge on the ligand (is ionic in a formal sense if not coordinated to the transition metal).

By a "monoanionic tridentate ligand" is meant a tridentate ligand that has one negative charge on the ligand.

By a "monoanionic monodentate ligand" is meant a monodentate ligand that has one negative charge on the ligand.

By "halogen" is meant any one or more of fluorine, chlorine, bromine or iodine, and chlorine, bromine and iodine are preferred. Which of chlorine, bromine or iodine is preferred in any particular situation will depend on the particular polymerization process being run, the other ingredients in that process, and which agent is used.

Preferred ligands herein are neutral bidentate ligands, as described in further detail below.

By an "activator", "cocatalyst" or a "catalyst activator" is meant a compound that reacts with a transition metal compound to form an activated catalyst species. This transition metal compound may be added initially, or may be formed in situ, as by reaction of a transition metal compound with an oxidizing agent. A preferred catalyst activator is an "alkyl aluminum compound", that is, a compound which has at least one alkyl group bound to an aluminum atom. Other groups such as, for example, alkoxide, hydride and halogen, may also be bound to aluminum atoms in the compound. Another useful activator is an alkylzinc compound.

"Noncoordinating ions" (or "weakly coordinating ions") are sometimes useful in the polymerization processes described herein. Such anions are well known to the artisan, see for instance W. Beck., et al., Chem. Rev., vol. 88, p. 1405–1421 (1988), and S. H. Strauss, Chem. Rev., vol. 93, p. 927–942 (1993), both of which are hereby included by reference. Relative coordinating abilities of such noncoordinating anions are described in these references, Beck at p. 1411, and Strauss at p. 932, Table III. Useful noncoordinating anions include, for example, $SbF_6^-$, BAF, $PF_6^-$, $B(C_6F5)_4^-$, or $BF_4^-$, wherein BAF is tetrakis[3,5-bis (trifluoromethyl)phenyl]borate.

A neutral Lewis acid or a cationic Lewis or Bronsted acid whose counterion is a weakly coordinating anion may also be present as part of the catalyst system, for example as a cocatalyst (or catalyst activator). By a "neutral Lewis acid" is meant a compound that is a Lewis acid capable of abstracting an anion from a late transition metal compound to form a weakly coordination anion. The neutral Lewis acid is originally uncharged (i.e., not ionic). Suitable neutral Lewis acids include $SbF_5$, $Ar_3B$ (wherein Ar is aryl), and $BF_3$. By a cationic Lewis acid is meant a cation with a positive charge such as $Ag^+$, $H^+$, and $Na^+$.

In many of those instances in which the transition metal compound does not contain an alkyl or hydride group already bonded to the metal, the neutral Lewis acid or a cationic Lewis or Bronsted acid may also alkylate or add a hydride to the metal, i.e., causes an alkyl group or hydride to become bonded to the metal atom, or a separate compound is added to add the alkyl or hydride group. It is preferred that a neutral Lewis acid which can alkylate or add hydride to the metal, or a combination of a Lewis acid and a compound which can alkylate or add hydride to the metal, be present, and either of these (single or multiple compounds) can be considered an activator. By "hydride" is meant a single hydrogen atom covalently bound to the transition metal. No particular charge of the transferred hydrogen is implied, i.e., the Lewis acid may formally protonate the metal (transfer $H^+$), but the product is referred to as a hydride.

A preferred neutral Lewis acid which can alkylate the transition metal is a selected alkyl aluminum compound, such as $R^9{}_3Al$, $R^9{}_2AlCl$, $R^9AlCl_2$, $(R^9AlCl)_2O$, and "$R^9AlO$" (alkylaluminoxanes), wherein $R^9$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, $[(CH_3)_2CHCH_2AlCl]_2O$ and $[(CH_3)_2CHCH_2]_3Al$. Preferred alkylaluminum compounds have at least one atom of an element more electronegative than carbon (on Pauling's electronegativity scale) attached to the aluminum atom. Such elements include halogen, especially chlorine, and oxygen. Another useful alkylating agent is a dialkyl zinc, such as diethyl zinc.

Preferred metals for the transition metal complex herein are Ni, Pd, Fe and Co, Ni and Fe are especially preferred, and Ni is particularly preferred.

Late transition metal complexes useful as polymerization catalysts herein, as well as combinations of two or more late transition metal catalyst, and combinations of late transition metal catalysts with other types of catalysts, are described in U.S. Pat. Nos. 5,714,556, 5,852,145, 5,880,241, 5,929,181, 5,932,670, 5,942,461, 5,955,555, 6,060,569, 6,103,658, 6,174,975, WO96/37522, WO97/23492, WO97/48735, WO98/30612, WO98/37110, WO98/38228, WO98/40420, WO98/42664, WO98/42665, WO98/47934, WO99/49969, WO99/41290, WO99/51550, WO00/50470, JP-A-09255712, JP-A-09255713, JP-A-11158213, JP-A-11180991, JP-A-11209426, EP-A-0893455 and EP-A-0924223, all of which are hereby included by reference for all purposes as if fully set forth. Unless otherwise stated herein, polymerization catalysts for the purposes of the present invention also include catalysts that produce olefin oligomers.

As described in the above-incorporated publications, suitable catalysts are complexes of a late transition metal (Group 8 to Group 10, IUPAC designation) with an organic ligand. Preferred ligands are mono- or bidentate ligands, especially neutral mono- or bidentate ligands. A specific preferred such organic ligand is of the formula (I)

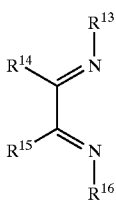

(I)

wherein:

$R^{13}$ and $R^{16}$ are each independently hydrocarbyl or substituted hydrocarbyl, provided that the atom bound to the imino nitrogen atom has at least two carbon atoms bound to it; and $R^{14}$ and $R^{15}$ are each independently hydrogen, hydrocarbyl, substituted hydrocarbyl, or $R^{14}$ and $R^{15}$ taken together are hydrocarbylene or substituted hydrocarbylene to form a carbocyclic ring.

As examples of when $R^{14}$ and $R^{15}$ are each independently a substituted hydrocarbyl may be mentioned when $R^{14}$ is -YR$^{17}$R$^{18}$ and $R^{15}$ is -ZR$^{19}$R$^{20}$, wherein Y and Z are each independently nitrogen, oxygen or sulfur and $R^{17}$ and $R^{19}$ are each independently hydrocarbyl, or substituted hydrocarbyl or taken together form a ring, and $R^{18}$ and $R^{20}$ are each independently hydrogen, hydrocarbyl, or substituted hydrocarbyl, provided that when Y is oxygen or sulfur $R^{18}$ is not present, and when Z is oxygen or sulfur $R^{20}$ is not present.

Preferably the late transition metal catalyst is not an iron compound and/or the late transition metal is not coordinated to a tridentate ligand. More preferably this tridentate ligand is not a bisimine of a 2,6-diacylpyridine or a 2,6-pyridinedicarboxaldehyde, and most preferably this tridentate ligand is not

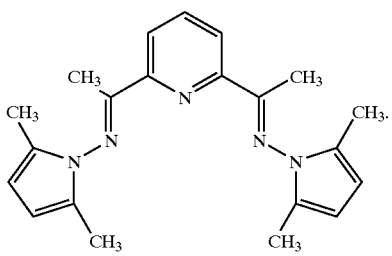

(X)

There are many different ways of preparing active polymerization catalysts of transition metal coordination compounds as described herein, many of which are described in the previously incorporated references (see, for example, U.S. Pat. Nos. 5,714,556, 5,880,241, 6,103,658 and WO00/06620), and those so described are applicable herein. "Pure" compounds which themselves may be active polymerization catalysts may be used, or the active polymerization catalyst may be prepared in situ by a variety of methods.

For instance, olefins may be polymerized by contacting, at a temperature of about −100° C. to about +200° C., a first compound W, which is a neutral Lewis acid capable of abstracting an anion to form a weakly coordinating anion; or a cationic Lewis or Bronsted acid whose counterion is a weakly coordinating anion; a second compound such as (II)

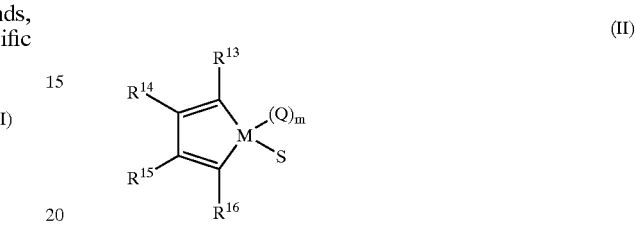

(II)

and one or more polymerizable olefins wherein:

M is an appropriate transition metal;

m is the oxidation state of M minus 1;

$R^{13}$ through $R^{16}$ are as defined above, each Q is independently a monoanion, preferably alkyl, hydride, chloride, iodide, or bromide; and S is a monoanion, preferably alkyl, hydride, chloride, iodide, or bromide.

In this instance it is preferred that W is an alkyl aluminum compound. Other methods for preparing active polymerization catalyst will be found in the previously incorporated references, and in the Examples herein.

The polymerization processes described herein may be run in a "normal" manner as described in the various references listed above for the various late transition metal complexes, with the oxidizing agent present during at least a portion of the polymerization. It is particularly preferred that the oxidizing agent be present (or added) continuously or essentially continuously (for example added periodically, particularly with little time between individual additions) during the polymerization while the components are present, for example, in the appropriate reactor. It is believed that the beneficial effect of the oxidizing agent is enhanced if it is present during most or all of the time the polymerization is taking place. The oxidizing agent not only usually enhances productivity of the catalyst, it also often increases the lifetime of the polymerization catalyst (which of course may also increase productivity depending on how long the polymerization is run).

The polymerization may be run in any of the known ways, for example, it may be a batch, semibatch or continuous polymerization which may be run as a liquid slurry, solution or gas phase polymerization. By "gas phase" is meant that the olefin monomer(s) is transported to the reactive polymerization site (i.e., to contact with the catalyst particle) as a gas (except perhaps to diffuse through some polyolefin surrounding the active site), for example in a fluidized bed reactor. Other additives normally present in such polymerizations may also be present herein. For example chain transfer agents such as hydrogen may be present. Such polymerizations are well known in the art, see for instance B. Elvers, et al., Ed., *Ullmann's Encyclopedia of Industrial Chemistry*, 5th Ed., Vol. A21, VCH Verlagsgesellschaft mbH, Weinheim, 1992, p. 496–514 and 518–531, which is hereby included by reference.

The polymerization processes herein may be run in the presence of various liquids, particularly aprotic organic liquids. The catalyst system, monomer(s), and polymer may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, cyclohexane, toluene, benzene, heptane, isooctane, methylene chloride, and 1,2,4-trichlorobenzene.

The olefin polymerizations herein may also initially be carried out in the "solid state" by, for instance, supporting the transition metal compound on a substrate such as silica or alumina, or a polymeric material, activating if necessary with one or more cocatalysts, and contacting with the olefin(s). Alternatively, the support may first be contacted (reacted) with one or more cocatalysts (if needed) such as an alkylaluminum compound, and then contacted with an appropriate transition metal compound. The support may also be able to take the place of a Lewis or Bronsted acid, for instance an acidic clay such as montmorillonite, if needed. Another method of making a supported catalyst is to start a polymerization or at least make a transition metal complex of another olefin or oligomer of an olefin such as cyclopentene on a support such as silica or alumina. These "heterogeneous" catalysts may be used to catalyze polymerization in the gas phase or the liquid phase.

The process of the present invention can be also used as last step of a multistep process such as described in the WO00/53646, which is incorporated by reference herein for all purposes as if fully set forth. In this process a polymer previously prepared with a different catalyst system is impregnated with the olefin polymerization catalyst system herein and then one or more olefins are polymerized according to the process of the present invention. The polymer of the first steps range from 10 to 70% of the total polymer obtained in the multistep process, preferably from 10 to 60%, more preferably 20 to 50%.

Other details concerning general polymerization conditions may be had by referring to the previously incorporated references.

Although not wishing to be bound by theory, it is believed that the oxidizing agents used herein function by oxidizing lower valent transition metal compounds to higher valent compounds, such as Ni[I] and/or Ni[0] compounds to Ni[II] compounds. It is further believed that the more active form of the polymerization catalyst is a (relatively) higher valent form of the transition metal compound, and that during the polymerization the transition metal is reduced (in an unwanted side reaction) to a lower valent form which is less active or inactive as a polymerization catalyst. The oxidizing agent thus oxidizes the lower valent form of the transition metal to the higher valent, more active form. This regenerates an active polymerization catalyst, thereby increasing the productivity and apparent rate of polymerization of the polymerization catalyst.

An "oxidizing agent" within the meaning of the present invention, therefore, is an agent capable of oxidizing the transition metal used in the polymerization catalyst, under polymerization conditions, from a lower valent state to the higher valent state to result in a re-activated polymerization catalyst. Thus the oxidizing agent should be a sufficiently strong oxidizing agent (as measured for instance by electrode potentials) to oxidize the appropriate transition metal to the desired oxidation state. The oxidizing agent, however, should not cause significant unwanted side reactions to produce large amounts of byproducts and/or be destroyed before it can carry out the desired oxidation. In addition the oxidizing agent should have some way of contacting the lower valent transition metal atoms, for example be soluble in a liquid medium used in the polymerization, or be volatile enough to be added to a gas phase polymerization process.

The oxidizing agent may be any means suitable for accomplishing the above-stated purpose. Preferred, however, are chemical oxidizing agents such as organic or inorganic compounds with the requisite properties. Preferred of the chemical oxidizing agents are one-electron oxidants. Useful oxidizing agents include, for example, iodine and halocarbons such as perfluoroalkyl iodides, $CI_4$, $CHI_3$, $CH_2I_2$, $ICH_2CH_2I$, and trityl iodide, preferably iodine. Another preferred oxidizing agent is a benzylic or allylic bromide or chloride such as α,α,α-trichlorotoluene and allyl chloride.

Other useful classes of oxidizing agents and/or individual oxidizing agents include, for example:

NO, $NO_2$, N-bromosuccinimide and $O_2$;

metal cations such as $Fe^{+3}$, $Cu^{+2}$, $Ag^{+2}$, and ferricinium cations;

iminium radical cations such as tris(4-bromophneyl) iminium hexachloroantimonate; and halogens and pseudohalogens such as BrCN, IBr and ICl.

One type of halocarbon which is useful has the formula

(V)

wherein:

$T^1$ is a hydrocarbyl or substituted hydrocarbyl group containing at least one halogen bonded to a carbon atom; preferably $T^1$ contains 2 or more halogen atoms, more preferably 3 or more halogen atoms;

$T^2$ is hydrogen, hydrocarbyl, substituted hydrocarbyl or a functional group, optionally containing one or more halogen bonded to a carbon atom.

Preferred agents formula (V) are those of the formula (VI):

$R^{19}$—C(O)—$OR^{20}$ (VI)

wherein:

$R^{19}$ is selected from the group consisting of hydrocarbyl or substituted hydrocarbyl wherein at least one hydrogen atom bonded to a carbon atom is replaced with a halogen atom; and $R^{20}$ is selected from the group consisting of $R^{19}$ or hydrocarbyl or substituted hydrocarbyl. Preferably 2 or more, more preferably 3 or more of the hydrogens in $R^{19}$ are replaced by halogen. $R^{19}$ is preferably selected from the group consisting of linear or branched, saturated or unsaturated $C_1$–$C_{20}$ perhaloalkyl, $C_3$–$C_{20}$ perhalocycloalkyl, $C_6$–$C_{20}$ perhaloaryl, $C_7$–$C_{20}$ perhaloalkylaryl and $C_7$–$C_{20}$ perhaloarylalkyl radical optionally containing heteroatoms belonging to groups 13 or 15–16 of the Periodic Table of the Elements wherein "perhalo" means that all the hydrogens bonded to the carbon atoms of the correspondent hydrocarbon radical are replaced with halogen atoms. $R^{20}$ is preferably selected form the group consisting of a C1–$C_{10}$ alkyl, $C_6$–$C_{20}$ aryl and $C_7$–$C_{20}$ alkylaryl.

More preferably the compound of formula (VI) has formula (VII), (VIII) or (IX)

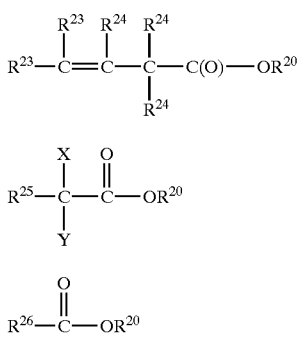

(VII)

(VIII)

(IX)

wherein:

R²⁰ has the meaning given above;

each R²³ is independently selected from the group consisting of halogen and R¹⁹, preferably each R²³ is independently selected from the group consisting of halogen trichloromethyl, perchloroethyl, perchloropropyl, perchlorobutyl; more preferably R²³ is halogen;

each R²⁴ is independently selected from the group consisting of hydrogen, halogen and R ; preferably each R is independently halogen, more preferably chlorine;

R²⁵ is selected from the group consisting of phenyl, thienyl, furyl, pyrollyl, pyridyl radicals; preferably R²⁵ is phenyl or a phenyl radical substituted by one or more halogen atoms, preferably chlorine;

X is halogen, preferably chlorine;

Y is selected from the group consisting of hydrogen, halogen, $C_1$–$C_{20}$ alkyl or $C_6$–$C_{20}$ aryl, $C_7$–$C_{20}$ alkylaryl and $C_7$–$C_{20}$ arylalkyl, and optionally containing halogen atoms; preferably Y is chlorine;

R²⁶ is selected from the group consisting of linear or branched, saturated or unsaturated $C_1$–$C_{20}$ perhaloalkyl, $C_3$–$C_{20}$ perhalocycloalkyl, $C_6$–$C_{20}$ perhaloaryl, $C_7$–$C_{20}$ perhaloalkylaryl and $C_7$–$C_{20}$ perhaloarylalkyl radical optionally containing heteroatoms belonging to groups 13 or 15–16 of the Periodic Table of the Elements wherein the suffix "perhalo" means that all the hydrogens bonded to the carbon atoms of the correspondent hydrocarbon radical are replaced with halogen atoms, preferably R²⁶ is selected from the group consisting of trichloromethyl, perchloroethyl, perchloropropyl and perchlorobutyl.

Non limitative examples of compounds of formula (VI) are:

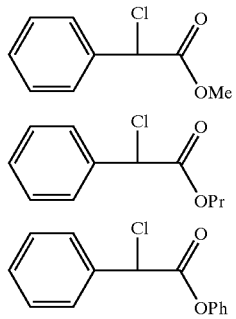

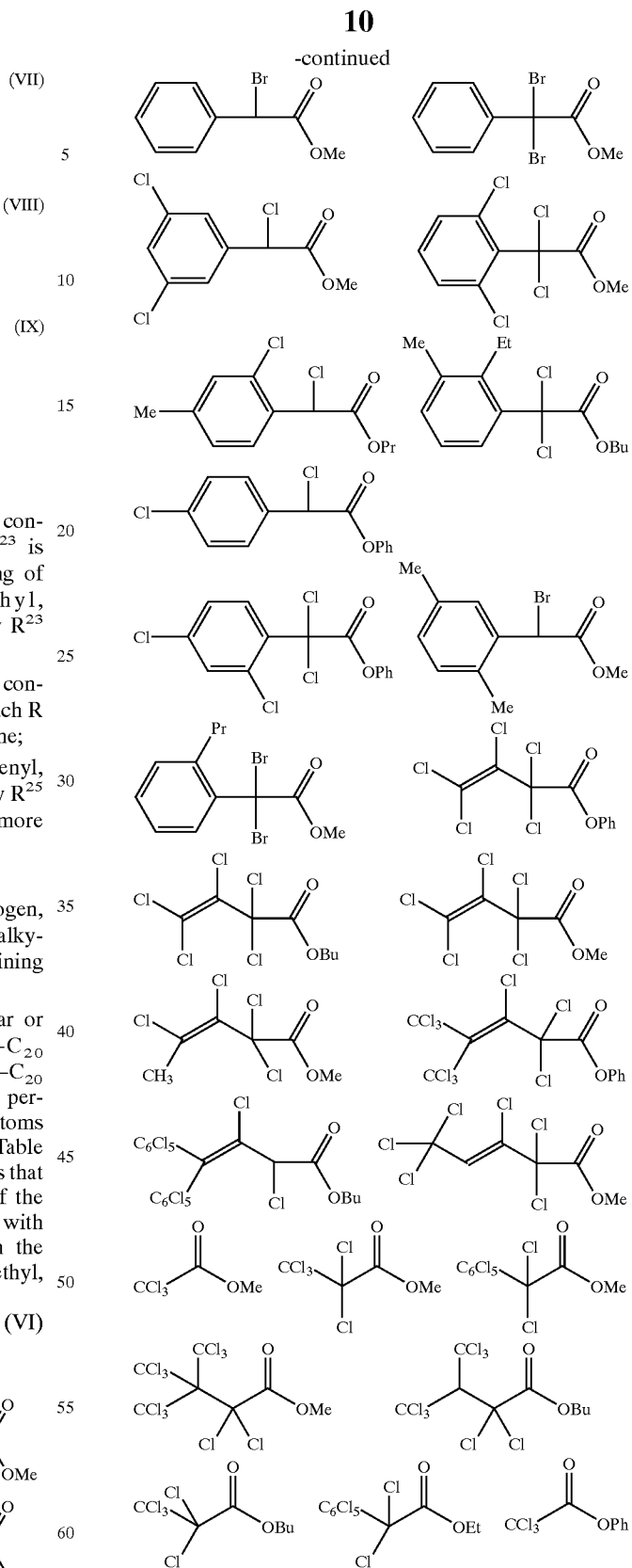

In (V) and any of its preferred forms it is preferred halogen present is chlorine and/or bromine, more preferably chlorine. Especially preferred compounds (VI) are esters of perchlorocrotonic acid or trichloroacetic acid.

Other halocarbons useful in the current process are found in U.S. Pat Nos. 4,710,552, 5,112,928 and 5,210,160, which are incorporated by reference herein for all purposes as if fully set forth. For example, mentioned in these patents are compounds such as allyl chloride, allyl bromide, crotyl chloride, crotyl bromide, propargyl chloride, propargyl bromide, α-chlorotoluene (benzyl chloride), α-bromotoluene, α,α,α-trichlorotoluene, α,α-dichlorotoluene, trichloroacetyl chloride, trichloromethyl vinyl ketone, and other specific compounds that have been previously mentioned herein.

The syntheses of the active halocarbons are well known in the art, and many of them are commercially available.

The chemical oxidizing agent may be introduced into the reactor in any suitable manner. For example in a solution or liquid slurry polymerization it may introduced as a solution in a suitable liquid. Since very little oxidizing agent is required, this additional stream will usually introduce very little "extra" liquid into the reactor. In a gas phase reaction the oxidizing agent may be introduced as a vapor, for example as a vapor in ethylene if ethylene is a monomer. This will be particularly useful when elevated temperatures (above room temperature) are present in the polymerization system, since at elevated temperatures the oxidizing agents have higher vapor pressures.

Iodine is preferred and, by iodine herein, it is meant iodine ($I_2$) itself, as well as compounds or combinations of compounds that readily generate iodine, or any chemically equivalent form of iodine such as the triiodide anion ($I_3^-$). For example the compound $KI_3$ is soluble in some organic solvent, and may be used in place of $I_2$. Another preferred agent is a benzylic or allylic bromide or chloride such as α,α,α-trichlorotoluene and allyl chloride.

Chemical oxidizing agents are, of course, chemically reactive, and may interact with other ingredients in the polymerization process or even the process equipment. While small amounts of such reactions may not adversely affect the polymerization, substances which may rapidly react with the chemical oxidizing agents may negate their effectiveness. For example it is believed that some activators such as alkylaluminum compounds and dialkylzinc compounds react with iodine to form alkyl iodides and aluminum or zinc iodides. Alkylaluminum compounds that react relatively rapidly with iodine are believed to include trialkylaluminum compounds such as trimethylaluminum and triisobutylaluminum. Aluminoxanes such as methylaluminoxane and dialkylzinc compounds such as diethylzinc react at somewhat slower but still appreciable rates, while alkylaluminum compounds that already contain aluminum halide groups react more slowly. Therefore alkylaluminum compounds such as dialkylaluminum chlorides, alkylaluminum dichlorides, alkylaluminum sesquichlorides and alkylhaloaluminoxanes such as $[R^1AlCl]_2O$ wherein $R^1$ is alkyl such as methyl, ethyl, propyl and isobutyl are preferred, alkylaluminum compounds, alkylaluminum sesquichlorides and $[R^1AlCl]_2O$ are more preferred, and alkylaluminum sesquichlorides and $[R^1AlCl]_2O$ are especially preferred. Even when a compound such as methylaluminoxane or diethylzinc is used, an improvement in productivity is seen, particularly when the concentration of methylaluminoxane or diethylzinc is kept as low as possible, consistent with obtaining a reasonably rapid polymerization rate.

The oxidizing agent is used in an amount (or is present in such a manner) effective to oxidize the transition metal used in the polymerization catalyst, under polymerization conditions, from a lower valent state to the higher valent state. Preferred amounts are sufficient to achieve an at least 10% increase in the productivity of the catalyst (measured in terms of kg polymer/g transition metal).

For chemical oxidizing agents, the molar ratio of oxidizing agent (such as iodine) to transition metal in the reactor feed(s) may vary depending on the particular polymerization system used, for example the activator present, but a generally useful range is a molar ratio of additive to late transition metal of about 5 to about 2000, preferably about 50 to about 1000. The activator may also be continuously or intermittently added to a batch or semibatch reaction. Preferably also the activator to agent ratio should be no less than about 1, more preferably at least about 2.

Any olefin monomer that may usually be (co)polymerized by the late transition metal catalyst may also be polymerized in the process described herein. Copolymers of two or more olefins, and copolymers with other types of polymerizable monomers (for example, carbon monoxide) are also included herein. Which active polymerization catalysts will polymerize which olefins (not all catalysts will polymerize all olefins or combinations of olefins) will also be found in the above listed references. Monomers useful herein include ethylene, propylene, other α-olefins of the formula $R^2CH=CH_2$, wherein $R^2$ is n-alkyl containing 2 to about 20 carbon atoms, cyclopentene, a styrene, a norbornene, and an olefin of the formula $H_2CH=CHR^3Z$, wherein $R^3$ is alkylene or a covalent bond, preferably —$(CH_2)_n$— wherein n is an integer of 1 to 20 or a covalent bond, more preferably a covalent bond, and Z is a functional group, preferably —$CO_2X$, wherein X is hydrogen, hydrocarbyl, especially alkyl, or substituted hydrocarbyl. Preferred monomers are ethylene, propylene and cyclopentene, and ethylene is especially preferred. Also preferred are copolymers in which ethylene is a monomer.

As indicated above, the oxidizing agents may chemically interact with the process equipment, so appropriate materials of construction should be used for the reactors used in the polymerization process herein. Thus the addition of any particular oxidizing agent may require the use of materials of construction that are resistant not only to the oxidizing agent but any products of reaction of that compound.

In the Examples the following abbreviations are used:

n-BPCC—n-butyl perchlorocrotonate

ETA—ethyl trichloroacetate

DSC—differential scanning calorimetry

GPC—gel permeation chromatography

IBACO—isobutylchloroaluminoxane

I.V.—intrinsic viscosity

MMAO—modified (with butyl groups) methylaluminoxane

Mn—number average molecular weight

Mw—weight average molecular weight

PE—polyethylene

RT—room temperature

Tm—melting point

In the Examples, all pressures gauge pressures. Except where otherwise noted, the nickel compound used was (III)

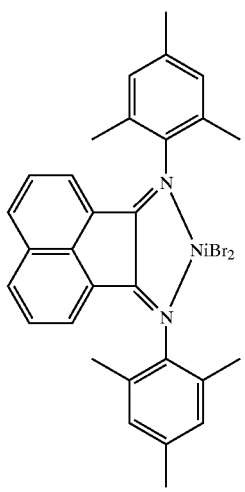

(III)

Another nickel compound used was

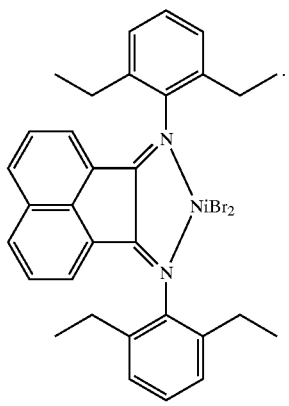

(IV)

EXAMPLE 1

A 600-mL stirred autoclave was loaded with 250 mL dry isooctane containing 1.5 mL 1,3-dichloro-1,3-diisobutylalumoxane (0.35 M in hexane) under nitrogen, and the nitrogen was displaced by pressuring with ethylene and venting 3 times. The solvent was saturated with ethylene by stirring at 350 kPa/60° C. for 10 min.

A solution of 80 mg iodine was made up in 250 mL dry, deaerated isooctane. The autoclave was vented and the iodine solution was pumped into the autoclave at 0.3 mL/min (50 equivalents of iodine per hour based on Ni) using a high-pressure liquid chromatography pump via a feed line through one of the autoclave head ports. After 15 sec of iodine solution feed, a solution of 0.3 mg of the Ni compound in 3 mL methylene chloride was injected via syringe through a head port. The autoclave was immediately pressured to 1.03 MPa with ethylene and was stirred in a constant-temperature water bath at 60° C. for 120 min as ethylene polymerized. The iodine feed was then stopped and the autoclave was vented. The viscous polymer suspension was diluted with acetone and filtered, and the resulting powder was oven-dried to yield 42.3 g (1529 kg polyethylene/g Ni) polyethylene powder.

Comparative Example 1

A 600-mL stirred autoclave was loaded with 200 mL dry isooctane containing 2.5 mL 1,3-dichloro-1,3-diisobutylalumoxane (0.35 M in hexane) under nitrogen, and the nitrogen was displaced by pressuring with ethylene and venting 3 times. The solvent was saturated with ethylene by stirring at 70 kPa/60° C. for 10 min. The ethylene was vented and 0.5 mg of (III) in 3 mL methylene chloride was injected via syringe through a head port. The autoclave was immediately pressured to 1.03 MPa with ethylene and was stirred in a constant-temperature water bath at 60° C. for 120 min as ethylene polymerized. The autoclave was then vented and the resulting suspension of polymer powder was diluted with acetone, filtered and oven-dried to yield 25.9 g (561 kg polyethylene/g Ni) polyethylene powder. This control example with no added iodine shows the great improvement afforded by addition of iodine to the polymerizations described in Example 1.

Comparative Example 2

A 600-mL stirred autoclave was loaded with 200 mL dry isooctane containing 2 mL 1,3-dichloro-1,3-diisobutylalumoxane (0.35 M in hexane) and 10 mg iodine under nitrogen, and the nitrogen was displaced by pressuring with ethylene and venting 3 times. The solvent was saturated with ethylene by stirring at 350 kPa/60° C. for 10 min. The ethylene was vented and 0.5 mg of (III) in 3 mL methylene chloride was injected via syringe through a head port. The autoclave was immediately pressured to 1.03 MPa with ethylene and was stirred in a constant-temperature water bath at 60° C. for 120 min as ethylene polymerized. The autoclave was then vented and the resulting suspension of polymer powder was diluted with acetone, filtered and oven-dried to yield 27.7 g (600 kg polyethylene/g Ni) polyethylene powder. This control example of batch addition of iodine shows the great improvement afforded by continuous iodine addition to the polymerizations described in Example 1.

EXAMPLE 2

A 600-mL stirred autoclave was loaded with 250 mL dry isooctane containing 2.5 mL 1,3-dichloro-1,3-diisobutylalumoxane (0.35 M in hexane) under nitrogen, and the nitrogen was displaced by pressuring with ethylene and venting 3 times. The solvent was saturated with ethylene by stirring at 350 kPa/70° C. for 10 min.

A solution of 80 mg iodine was made up in 250 mL dry, deaerated isooctane. The autoclave was vented and the iodine solution was pumped into the autoclave at 0.5 mL/min (50 equivalents of iodine per hour based on Ni) using a high-pressure liquid chromatography pump via a feed line through one of the autoclave head ports. After 15 sec of iodine solution feed, a solution of 0.5 mg of the Ni compound in 3 mL methylene chloride was injected via syringe through a head port. The autoclave was immediately pressured to 1.03 MPa with ethylene and was stirred in a constant-temperature water bath at 70° C. for 120 min as ethylene polymerized. The iodine feed was then stopped and the autoclave was vented. The viscous polymer suspension was diluted with acetone and filtered, and the resulting powder was oven-dried to yield 46.0 g (993 kg polyethylene/g Ni) polyethylene powder.

EXAMPLE 3

A 600-mL stirred autoclave was loaded with 200 mL dry isooctane under nitrogen, and the nitrogen was displaced by pressuring with ethylene and venting 3 times. The isooctane was saturated with ethylene by stirring at 70 kPa for 10 min as the autoclave was cooled in an ice bath to 0° C. The ethylene was vented and a solution of 320 mg iodine in 100 mL dry, deaerated isooctane was pumped into the autoclave at 0.2 mL/min via a feed line through one of the autoclave head ports. After 1 min of iodine solution feed, a slurry of 100 mg silica-supported (III) in 5 mL isooctane was injected via syringe through a head port. This supported catalyst was made by contacting a toluene solution of (III) with silica-supported methylalumoxane; 100 mg of the catalyst contained 2 mg of (III) and 18 wt % aluminum in the form of methylalumoxane. The autoclave was immediately pressured to 1.03 MPa with ethylene and was stirred at 0–3° C./1.03 MPa for 30 min as ethylene polymerized. Then the autoclave was heated in a hot water bath to quickly raise the internal temperature to 60° C. and the polymerization was continued at 1.03 MPa/60° C. for 3.5 hr more. The iodine feed then was stopped, and the autoclave was vented. The polymer suspension was diluted with acetone, suction-filtered and oven-dried to yield 45.9 g (249 kg polyethylene/g Ni) fine polymer beads.

Comparative Example 3

A 600-mL stirred autoclave was loaded with 200 mL dry isooctane under nitrogen, and the nitrogen was displaced by pressuring with ethylene and venting 3 times. The isooctane was saturated with ethylene by stirring at 70 kPa for 10 min as the autoclave was cooled in an ice bath to 0° C. The ethylene was vented and a slurry of 100 mg silica-supported (III) in 5 mL isooctane was injected via syringe through a head port. This is a sample of the same catalyst batch used in Example 3. The autoclave was immediately pressured to 1.03 MPa with ethylene and was stirred at 0–3° C./1.03 MPa for 30 min as ethylene polymerized. Then the autoclave was heated in a hot water bath to quickly raise the internal temperature to 60° C. and the polymerization was continued at 1.03 MPa/60° C. for 3.5 h more. The autoclave was vented. The polymer suspension was diluted with acetone, suction-filtered and oven-dried to yield 34.2 g (185 kg polyethylene/g Ni) fine polymer beads. This control example with no added iodine shows the great improvement afforded by iodine addition to the polymerizations described in Example 3.

EXAMPLE 4

A 600-mL stirred autoclave was loaded with 200 mL dry isooctane containing 0.5 mL modified methylalumoxane (Akzo MMAO-3A; 1.7 M in hexane; contains about 30% isobutyl groups) under nitrogen, and the nitrogen was displaced by pressuring with ethylene and venting 3 times. The solvent was saturated with ethylene by stirring at 350 kPa/60° C. for 10 min.

A solution of 80 mg iodine was made up in 250 mL dry, deaerated isooctane. The autoclave was vented and the iodine solution was begun pumping into the autoclave at 0.3 mL/min (50 equivalents of iodine per hour based on Ni) using a high-pressure liquid chromatography pump via a feed line through one of the autoclave head ports. After 15 sec of iodine solution feed, a solution of 0.5 mg (III) in 3 mL methylene chloride was injected via syringe through a head port. The aluminum:nickel molar ratio was 1000. The autoclave was immediately pressured to 1.03 MPa with ethylene and was stirred in a constant-temperature water bath at 60° C. for 120 min as ethylene polymerized. The iodine feed was then stopped and the autoclave was vented. The viscous polymer suspension was diluted with acetone and filtered, and the resulting powder was oven-dried to yield 21.7 g (984,300 turnovers; 470 kg polyethylene/g Ni) polyethylene powder.

EXAMPLE 5

This polymerization was conducted identically to Example 4, except 0.25 mL MMAO-3A was used (Al:Ni=500). The polymer yield was 30.2 g (1,370,000 turnovers; 654 kg polyethylene/g Ni).

EXAMPLE 6

This polymerization was conducted identically to Example 5, except a solution of 80 mg iodine in 125 mL isooctane was fed to the polymerization at 0.5 mL/min ($I_2$:Ni=100/hr). The polymer yield was 39.0 g (1,769,000 turnovers; 845 kg polyethylene/g Ni).

Examples 4, 5 and 6 demonstrate the manner in which to balance the relative quantities of activator (e.g., aluminum alkyl) and iodine.

EXAMPLE 7

A 600-mL stirred autoclave was loaded with 200 mL dry isooctane containing 2.0 mL 1,3-dichloro-1,3-diisobutylalumoxane (0.35 M in hexane) under nitrogen, and the nitrogen was displaced by pressuring with ethylene and venting 3 times. The solvent was saturated with ethylene by stirring at 350 kPa/60° C. for 10 min.

A solution of 60 mg methyl iodide was made up in 120 mL dry, deaerated isooctane. The autoclave was vented and the methyl iodide solution was begun pumping into the autoclave at 0.5 mL/min (130 equivalents of methyl iodide per hour based on Ni) using a high-pressure liquid chromatography pump via a feed line through one of the autoclave head ports. After 15 sec of methyl iodide solution feed, a solution of 0.5 mg (III) in 3 mL methylene chloride was injected via syringe through a head port. The aluminum:nickel molar ratio was 1800. The autoclave was immediately pressured to 1.03 MPa with ethylene and was stirred in a constant-temperature water bath at 60° C. for 120 min as ethylene polymerized. The methyl iodide feed was then stopped and the autoclave was vented. The viscous polymer suspension was diluted with acetone and filtered, and the resulting powder was oven-dried to yield 33 g (1,492,000 turnovers; 712 kg polyethylene/g Ni) polyethylene powder.

EXAMPLES 8 and 9

In each of these examples 1.6 mg (2.5 $\mu$mol) of (III) was used. An iodine stock solution of 80 mg in 20 ml of methylene chloride was made up and used (31 $\mu$mol/2 mL). The MMAO-3A solution in heptane contained 6.8 weight percent Al, and IBCAO (isobutylchloroaluminoxane) solution in toluene was 0.34 M. A 3.8 (1 gal) stirred autoclave was used.

Granular NaCl (1000 g) was added to the reactor, and the NaCl dried at 150° C. under $N_2$ for 24 h, then purged with Ar for 50 min at 100° C., then purged with ethylene for 10 min. The autoclave was cooled to 20° C., and then vented with Ar and then 4 times with ethylene. The scavenger was added with 1 L of propane and the contents stirred for 15 min. Then, separately, (III) was contacted with the cocatalyst in 4 mL methylene chloride and allowed to react for 10 min. This solution was then added to the reactor with 250 mL propane, stirred 2 min, the propane vented to <70 kPa, while the autoclave setpoint was still at 20° C. The ethylene was added to a pressure of 700 kPa, and these conditions maintained for 10 min. Then (time=0) the temperature setpoint was increased to 60° C., 2 mL of the iodine stock solution was added and the ethylene pressure was increased to 2.41 MPa. At 15, 30 and 45 min 2 mL of the iodine stock solution was injected. After 60 min the polymerization was terminated. The polymer was isolated by washing with 80° C. water 4 times in a blender. Other detail of these Examples are given in Table 1.

TABLE 1

| Example | 8 | 9 |
|---|---|---|
| Scavenger | IBCAO | MMAO-3A |
| (mL) | 3.3 | 1.2 |
| (mmol) | 2.3 | 2.2 |

TABLE 1-continued

| Example | 8 | 9 |
|---|---|---|
| (Al/Ni) | 900 | 880 |
| Cocatalyst | IBCAO | IBCAO |
| (mL) | 0.4 | 0.4 |
| (mmol) | 0.3 | 0.3 |
| (Al/Ni) | 100 | 100 |
| g PE | 45 | 97 |
| k PE/g Ni | 307 | 661 |

The productivities (kg PE/g Ni, PE is polyethylene) in Examples 9 and 10 are about 40–50% higher than those obtained in similar polymerizations without iodine present.

EXAMPLE 10

A 600 mL stirred autoclave reactor was dried at 130° C. under vacuum, purged with nitrogen pressure (1.72 MPa) three times, and cooled under pressure. The nitrogen was displaced with ethylene (1.03 MPa) by pressuring and venting the reactor three times. The reactor was charged with 200 mL dry isooctane containing 0.46 mL (0.16 mmol) 1,3-dichloro-1,3-diisobutylaluminoxane (0.34 M in toluene), heated to 60° C., and saturated with ethylene while stirring at 1000 rpm.

A solution of iodine in dry isooctane (0.66 mM) under nitrogen was pumped into the autoclave at 0.20 mL/min (20 equivalents of iodine per hour based on Ni) using a high-pressure liquid chromatography pump. After 30 sec of iodine solution feed, a solution of 0.25 mg (0.39 μmol) of the Ni compound (III) dissolved in 3 mL dichloromethane and diluted with 7 mL toluene was injected into the reactor using a 0.1 MPa overpressure of nitrogen. The reactor was maintained at 1.03 MPa and 60° C. in a constant-temperature water bath for 120 min. The ethylene uptake was monitored using calibrated mass flow meters and the pressure drop from a gas reservoir. The polymerization was terminated by stopping the iodine feed and venting the reactor pressure. The viscous polymer suspension was diluted with acetone. The polymer was collected by vacuum filtration and dried at 70° C. in a nitrogen-purged vacuum oven to yield 17.9 g (782 kg polyethylene/g Ni) polyethylene powder. Additional Examples that follow this procedure are shown in Table 2.

TABLE 2

Polymerizations using nickel complex (III), catalyst activators, and reactivators

| Example | (III) μM | Ral | Al:Ni Equiv. | RI | RI:Ni equiv./hr | Time min | Yield kg/g Ni |
|---|---|---|---|---|---|---|---|
| 10 | 2 | (iBuAlCl)$_2$O | 800 | I$_2$ | 20 | 120 | 782 |
| CE4 | 2 | (iBuAlCl)$_2$O | 800 | — | — | 120 | 478 |
| 11 | 2 | Et$_3$Al$_2$Cl$_3$ | 800 | I$_2$ | 20 | 120 | 1167 |
| CE5 | 2 | Et$_3$Al$_2$Cl$_3$ | 800 | — | — | 120 | 438 |
| 12 | 2 | Et$_3$Al$_2$Cl$_3$ | 800 | I$_2$ | 20 | 225 | 1694 |
| 13 | 2 | Et$_3$Al$_2$Cl$_3$ | 800 | I$_2$ | 20 | 90 | 947 |
| 14 | 2 | iBu$_2$AlCl | 800 | I$_2$ | 20 | 120 | 849 |
| 15 | 2 | EtAlCl$_2$ | 800 | I$_2$ | 20 | 120 | 497 |
| 16 | 2 | Et$_3$Al$_2$Cl$_3$ | 800 | ICH$_2$CH$_2$I | 20 | 120 | 584 |
| 17 | 2 | Et$_3$Al$_2$Cl$_3$ | 800 | CH$_2$I$_2$ | 20 | 120 | 673 |
| 18 | 2 | Et$_3$Al$_2$Cl$_3$ | 800 | CHI$_3$ | 20 | 120 | 711 |
| 19 | 2 | Et$_3$Al$_2$Cl$_3$ | 800 | Cl$_4$ | 10 | 120 | 683 |
| 20 | 2 | Et$_3$Al$_2$Cl$_3$ | 800 | Cl$_4$ | 20 | 120 | 1002 |
| 21 | 2 | Et$_3$Al$_2$Cl$_3$ | 800 | Cl$_4$ | 40 | 120 | 857 |

EXAMPLE 22

The procedure of Example 10 was modified by replacing the 1,3-dichloro-1,3-diisobutylaluminoxane with 0.17 mL (0.16 mmol) ethylaluminum sesquichloride (0.91 M in toluene) and the isooctane with cyclohexane as solvent. The polymerization was terminated after 90 min by stopping the iodine feed and venting the reactor pressure. The polymer was fully dissolved in the cyclohexane until it was precipitated by diluting with acetone to yield 21.67 g (947 kg polyethylene/g Ni) polyethylene powder. The melt index (190° C., 2160 g) was 18. The branch content was 26.9 CH$_3$/1000 CH$_2$ by $^1$H NMR (500 MHz, Cl$_2$CDCDCl$_2$, 120° C.). The peak melting temperature was 102° C. (107 J/g) by DSC on the second heating cycle. The molecular weights were M$_n$ of 22,941 and M$_w$ of 45,022 by GPC (1,2,4-trichlorobenzene, 135° C., universal calibration as polyethylene).

EXAMPLE 23

The procedure of Example 10 was modified by replacing the 1,3-dichloro-1,3-diisobutylaluminoxane with 0.17 mL (0.16 mmol) ethylaluminum sesquichloride (0.91 M in toluene) and the solution of iodine with a solution of tetraiodomethane in dry isooctane (0.66 mM) that was pumped at 0.20 mL/min (20 equivalents per hour based on Ni) to yield 22.95 g (1002 kg polyethylene/g Ni) polyethylene powder. The solution of CI$_4$ was prepared in near darkness and the transfer lines protected from light. The melt index (190° C., 2160 g) was 28.6. The branch content was 33.1 CH$_3$/1000 CH$_2$ by $^1$H NMR (500 MHz, Cl$_2$CDCDCl$_2$, 120° C.). The peak melting temperature was 98° C. (95 J/g) by DSC on the second heating cycle. The molecular weights were $M_n$ of 21,109 and $M_w$ of 41,358 by GPC (1,2,4-trichlorobenzene, 135° C., universal calibration as polyethylene).

Comparative Example 6

A 600 mL stirred autoclave reactor was dried at 130° C. under vacuum, purged with nitrogen pressure (1.72 MPa) three times, and cooled under pressure. The nitrogen was displaced with ethylene (1.03 MPa) by pressuring and venting the reactor three times. The reactor was charged with 200 mL dry isooctane containing 0.17 mL (0.16 mmol) ethylaluminum sesquichloride (0.91 M in toluene), heated to 70° C., and saturated with ethylene while stirring at 1000 rpm.

A solution of 0.25 mg (0.38 μmol) of the Ni compound (IV) dissolved in 3 mL dichloromethane and diluted with 7 mL isooctane was injected into the reactor using a 0.1 MPa overpressure of nitrogen. The reactor was maintained at 1.03 MPa and 70° C. in a constant-temperature water bath. The ethylene uptake was monitored using calibrated mass flow meters and the pressure drop from a gas reservoir. The polymerization was terminated after 45 min by venting the reactor pressure because the ethylene uptake had ceased. The polymer was fully dissolved in the isooctane until it was precipitated by diluting with acetone. The polymer was collected by vacuum filtration and dried at 70° C. in a nitrogen-purged vacuum oven to yield 3.68 g (165 kg polyethylene/g Ni) polyethylene powder. The melt index (190° C., 2160 g) was 5.7. The branch content was 66.7 $CH_3$/1000 $CH_2$ by $^1$H NMR (500 MHz, $Cl_2CDCDCl_2$, 120° C.). The peak melting temperature was 62° C. (42 J/g) by DSC on the second heating cycle. The molecular weights were $M_n$ of 38,292 and $M_w$ of 63,831 by GPC (1,2,4-trichlorobenzene, 135° C., universal calibration as polyethylene).

EXAMPLE 24

A 600 mL stirred autoclave reactor was dried at 130° C. under vacuum, purged with nitrogen pressure (1.72 MPa) three times, and cooled under pressure. The nitrogen was displaced with ethylene (1.03 MPa) by pressuring and venting the reactor three times. The reactor was charged with 200 mL dry isooctane containing 0.17 mL (0.16 mmol) ethylaluminum sesquichloride (0.91 M in toluene), heated to 70° C., and saturated with ethylene while stirring at 1000 rpm.

A solution of iodine in dry isooctane (0.66 mM) under nitrogen was pumped into the autoclave at 0.20 mL/min (20 equivalents of iodine per hour based on Ni) using a high-pressure liquid chromatography pump. After 30 sec of iodine solution feed, a solution of 0.25 mg (0.38 μmol) of the Ni compound (IV) dissolved in 3 mL dichloromethane and diluted with 7 mL isooctane was injected into the reactor using a 0.1 MPa overpressure of nitrogen. The reactor was maintained at 1.03 MPa and 70° C. in a constant-temperature water bath for 120 min. The ethylene uptake was monitored using calibrated mass flow meters and the pressure drop from a gas reservoir. The polymerization was terminated by stopping the iodine feed and venting the reactor pressure. The polymer was fully dissolved in the isooctane until it was precipitated by diluting with acetone. The polymer was collected by vacuum filtration and dried at 70° C. in a nitrogen-purged vacuum oven to yield 9.88 g (443 kg polyethylene/g Ni) polyethylene powder. The melt index (190° C., 2160 g) was 5.2. The branch content was 72.1 $CH_3$/1000 $CH_2$ by $^1$H NMR (500 MHz, $Cl_2CDCDCl_2$, 120° C.). The peak melting temperature was 61° C. (42 J/g) by DSC on the second heating cycle. The molecular weights were $M_n$ of 41,455 and $M_w$ of 70,502 by GPC (1,2,4-trichlorobenzene, 135° C., universal calibration as polyethylene).

EXAMPLE 25

The procedure of Example 24 was modified by charging 350 kPa of hydrogen to the reactor from a 10.1 mL addition cylinder after charging the isooctane to yield 6.81 g (305 kg polyethylene/g Ni) polyethylene powder. The melt index (190° C., 2160 g) was 15. The branch content was 62.2 $CH_3$/1000 $CH_2$ by $^1$H NMR (500 MHz, $Cl_2CDCDCl_2$, 120° C.). The peak melting temperature was 59° C. (29 J/g) by DSC on the second heating cycle. The molecular weights were $M_n$ of 27,009 and $M_w$ of 50,741 by GPC (1,2,4-trichlorobenzene, 135° C., universal calibration as polyethylene).

EXAMPLE 26

The procedure of Example 24 was modified by charging 690 kPa of hydrogen to the reactor from an 10.1 mL addition cylinder to yield 5.56 g (249 kg polyethylene/g Ni) polyethylene powder. The melt index (190° C., 2160 g) was 34. The branch content was 78.1 $CH_3$/1000 $CH_2$ by $_1$H NMR (500 MHz, $Cl_2CDCDCl_2$, 120° C.). The peak melting temperature was 57° C. (16 J/g) by DSC on the second heating cycle. The molecular weights were $M_n$ of 23,970 and $M_w$ of 45,700 by GPC (1,2,4-trichlorobenzene, 135° C., universal calibration as polyethylene).

EXAMPLE 27

A 600 mL stirred autoclave reactor was dried at 130°C. under vacuum, purged with nitrogen by pressuring (1.72 MPa) and venting the reactor three times, and cooled under nitrogen pressure. The nitrogen was displaced with ethylene by pressuring (450 kPa) and venting the reactor three times. The reactor was charged with 200 mL dry isooctane containing 0.46 mL (79 μmol, 100 equiv. Zn per Ni) of a solution of diethylzinc, $Et_2Zn$, in toluene (0.17 M), cooled to 0° C., and the isooctane was saturated with ethylene (450 kPa) while stirring at 1000 rpm.

A solution of 0.5 mg (0.79 μmol) of the Ni complex (III) and 1.26 mg (1.57 μmol, 2 equiv. per Ni) of N,N-dimethylanilinium tetrakis(pentafluorophenyl)borate, $PhNMe_2H\ B(C_6F_5)_4$, which were dissolved in 1 mL dichloromethane and diluted with 9 mL toluene, was injected into the reactor using a 0.1 MPa overpressure of nitrogen. After allowing 5 min to initiate the polymerization at 0° C., a solution of iodine in dry isooctane (1.31 mM) under nitrogen was pumped into the autoclave at 0.40 mL/min (40 equivalents of iodine per hour based on Ni) using a high-pressure liquid chromatography pump and the reactor was heated rapidly to 60° C. in a constant-temperature water bath as the ethylene pressure was increased to 1.03 MPa. The ethylene uptake was monitored using calibrated mass flow meters and the pressure drop from a gas reservoir. The polymerization was terminated after 120 min by stopping the iodine feed and venting the reactor pressure. The viscous polymer suspension was diluted with acetone. The polymer was collected by vacuum filtration and dried at 70° C. in a nitrogen-purged vacuum oven to yield 21.47 g (463 kg polyethylene/g Ni) polyethylene powder. The melt index (190° C., 2160 g) was 6.0. The branch content was 29.1 $CH_3$/1000 $CH_2$ by $^1$H NMR (500 MHz, $Cl_2CDCDCl_2$, 120° C.). The peak melting temperature was 95° C. (104 J/g) by DSC on the second heating cycle. The molecular weights by GPC (1,2,4-trichlorobenzene, 135° C., universal calibration as polyethylene) were $M_n$ of 19,200 and $M_w$ of 61,700. Additional Examples that followed this procedure are shown in Table 3.

TABLE 3

Polymerizations using nickel complex (III), catalyst activator, N,N-dimethylanilinium tetrakis(pentafluorophenyl)borate, and iodine

| Example | (III) ($\mu$M) | $R_xM$ | M:Ni Equiv. | B:Ni equiv. | $I_2$:Ni equiv./hr | Time min | Yield kg/g Ni |
|---|---|---|---|---|---|---|---|
| 27 | 4 | $Et_2Zn$ | 100 | 2 | 40 | 120 | 463 |
| 28 | 4 | $Et_2Zn$ | 100 | 2 | 20 | 120 | 439 |
| 29 | 4 | $Et_2Zn$ | 100 | 2 | 80 | 90 | 351 |
| CE7 | 4 | $Et_2Zn$ | 100 | 2 | — | 90 | 328 |
| 30 | 4 | $iBu_3Al$ | 100 | 2 | 5 | 120 | 317 |
| CE8 | 4 | $iBu_3Al$ | 100 | 2 | — | 120 | 295 |
| CE9 | 4 | $iBu_3Al$ | 800 | 2 | 20 | 90 | 137 |

Comparative Example 10

The procedure of Example 27 was modified by omitting the iodine feed. The ethylene uptake ceased after 85 min, so the polymerization was terminated by venting the reactor pressure after 90 min. The viscous polymer suspension was diluted with acetone. The polymer was collected by vacuum filtration and dried at 70° C. in a nitrogen-purged vacuum oven to yield 15.23 g (328 kg polyethylene/g Ni) polyethylene powder. The melt index (190° C., 2160 g) was 5.3. The branch content was 30.0 $CH_3/1000$ $CH_2$ by $^1H$ NMR (500 MHz, $Cl_2CDCDCl_2$, 120° C.). The peak melting temperature was 96° C. (113 J/g) by DSC on the second heating cycle. The molecular weights by GPC (1,2,4-trichlorobenzene, 135° C., universal calibration as polyethylene) were $M_n$ of 26,600 and $M_w$ of 74,400X.

EXAMPLE 31–39

Comparative Examples 11–16

Thermal analysis: DSC measurements were made using a DSC Mettler. The instrument is calibrated with indium and tin standards. A weighed sample (5–10 mg) was sealed into an aluminum pan, heated to 200° C. and kept at that temperature for 5 min to allow a complete melting of all the crystallites. The sample was cooled at 20° C./min to 0° C. After standing 5 minutes at 0° C., the sample was heated to 200° C. at a rate of 10° C./min. In this second heating run, the peak temperature was assumed as melting temperature (Tm) and the area as the melting enthalpy ($\Delta H_f$).

Intrinsic viscosity was measured in tetrahydronaphthalene (THN) solution obtained by dissolving the polymer powder at 135° C. for 1 h.

Modified methylalumoxane MMAO-3A, containing 7 wt % Al in heptane, was purchased from Akzo Nobel. 1,3-Dichloro-1,3-diisobutylaluminoxane (IBCAO) (0.34 M Al in toluene) was supplied by Aldrich.

EXAMPLE 31

A 250 ml glass autoclave, provided with magnetic stirrer, temperature indicator and ethylene feed line, was purified and fluxed with ethylene at 35° C. n-Heptane (100 ml) and 0.88 ml (1.6 mmol) of MMAO were introduced into the reactor at RT. The temperature was then raised to 50° C. and the ethylene pressure to 520 kPa in order to allow the monomer to dissolve into the solvent. The catalyst system was separately prepared by introducing 0.18 ml (0.4 mmol) of MMAO in 2 ml of n-heptane and then adding 1 ml of a 2 mM solution of (IV) in $CH_2Cl_2$ (0.002 mmol, Al/Ni=200 mol/mol). The catalyst solution was stirred for 5 min and then introduced into the autoclave after venting ethylene until the pressure reaches 0 kPa. The reactor was closed and pressurized again with ethylene to 520 kPa. The total pressure was kept constant by feeding ethylene. After 15 min, the reactor was vented and 0.10 mmol of n-BPCC, diluted in 2 ml of n-heptane, was introduced into the polymerization. The pressure was raised again, immediately after the n-BPCC injection, and the polymerization proceeded for 15 more min. It was stopped by cooling, venting the reactor and introducing 1 ml of methanol. The polymer was coagulated with acetone/HCl, filtered and dried in vacuum at 60° C. Polymer (6.7 g) was recovered. Polymerization data are summarized in Table 4.

EXAMPLE 32

The procedure described in Example 31 was repeated with the only difference that ETA was used instead of n-BPCC. Polymer (7.5 g) was recovered. Polymerization data are summarized in Table 4.

Comparative Example 11

The procedure described in Example 31 was repeated with the only difference that the polymerization was carried on for 30 min, without any interruption and no n-BPCC was added. Polymer (5.9 g) was recovered. Polymerization data are summarized in Table 4.

TABLE 4

| Example | Additive | Time of injection (min) | Yield (g) | Activity (kg PE/g Ni) |
|---|---|---|---|---|
| 31 | n-BPCC | 15 | 6.7 | 75 |
| 32 | ETA | 15 | 7.5 | 64 |
| CE11 | None | = | 5.9 | 51 |

EXAMPLE 33

Preparation of a homopolymer of propylene [step (I)]: In a 100 ml glass flask, treated beforehand in nitrogen at 90° C. for three h, 0.0098 g of a solid component containing titanium, prepared according to the procedure of Example 3 of EP-A-395083, 0.76 g of triethylaluminum (TEAL) and 0.313 g of cyclohexylmethyldimethoxysilane (CMMS) were brought into contact in 10 ml of hexane for 5 min. The mixture was then fed into a 4-l steel autoclave, which had been treated beforehand with nitrogen at 90° C. for 3 h. Feed was effected at 30° C. in a propylene atmosphere. 1-L of $H_2$ and 1.2 kg of propylene were then introduced and the autoclave was heated to 70° C. Polymerization was effected for two h, followed by degassing in a stream of $N_2$ at 70° C. for 1 h. Spherical polymer (238 g) with the following characteristics were obtained: MIL=3.5; porosity (% voids)= 24%.

Treatment of the homopolymer with a deactivating agent [step (II)(a)]: After degassing propylene, the same reactor was charged with 1000 ml of hexane moistened with 0.513 g of water. It was left in contact with the polymer at 50° C. for 30 min, under a nitrogen atmosphere. The liquid was removed by siphoning and some washings with cycles of vacuum/nitrogen were carried out at RT.

Treatment of the deactivated homopolymer with MMAO/ (III) mixture [stage (II)(b)] and ethylene polymerization [stage (III)]: 70 g of porous deactivated polypropylene (70 g) from stage (II)(a) were loaded into a 2.6 L stainless steel reactor. Liquid propane (500 ml) and 3.7 ml of MMAO solution (6.8 mmol of Al; Al/Ni=2000 mol/mol) diluted in 2.3 ml of n-heptane, were introduced into the reactor, to scavenge liquid propane. The reactor was maintained at 25° C., under a total pressure of 1.08 MPa. At the same time, 2.16 mg (3.4 μmol) of (IV) was dissolved in 6.0 ml of toluene in a glass vessel, and 0.62 ml of MMAO solution (0.34 mmol of Al; Al/Ni=100 mol/mol) was then added. The mixture was stirred for 2 min at RT and then loaded into the reactor with a nitrogen overpressure. After 2–3 min of stirring, the propane was flashed off in a few minutes, while maintaining the temperature at 20–30° C. Then, ethylene was fed all at once to a total pressure of 2.48 MPa; ethylene concentration was about 1.17 mol/L. The polymerization was carried out at 60° C. for 4 h, keeping the pressure constant by feeding ethylene. During the polymerization, a 0.017 M solution of n-BPCC in n-heptane, was injected with a ethylene overpressure, according to the following scheme:

| 3.0 ml | at the | 18$^{th}$ minute |
|---|---|---|
| 3.5 ml | at the | 45$^{th}$ minute |
| 3.5 ml | at the | 75$^{th}$ minute |
| 3.5 ml | at the | 180$^{th}$ minute. |

The overall n-BPCC/Ni molar ratio was 68. After stopping the polymerization reaction by venting off ethylene, the reactor was cooled to RT and 247 g of polymer was obtained, in the form of free-flowing spheroid particles, containing 71.6 wt % of ethylene polymer. A total of 177 g of ethylene polymer was produced, corresponding to an activity of 890 kg PE/g Ni, having Tm=131.8° C. (experimental) and I.V.=1.97 dl/g (calculated). Polymerization data are summarized in Table 5.

EXAMPLE 34

The procedure described in Example 33 was repeated with the only difference that the polymerization was stopped after 2 h instead of 4 and the n-BPCC solution was 0.05 M and was injected according to the following scheme:

| 3.0 ml | at the | 10$^{th}$ minute |
|---|---|---|
| 3.5 ml | at the | 25$^{th}$ minute |
| 3.5 ml | at the | 40$^{th}$ minute |

The overall n-BPCC/Ni molar ratio was 150. A total of 235 g of polymer was obtained in the form of free-flowing spheroid particles, containing 70 wt % of ethylene polymer. A total of 165 g of ethylene polymer was produced, corresponding to an activity of 827 kg PE/g Ni. Polymerization data are summarized in Table 5.

EXAMPLE 35

The procedure described in Example 34 was repeated with the only difference that ethyl trichloroacetate (ETA) was used as oxidant, instead of n-BPCC. ETA solution (0.05 M in n-heptane) was injected according to the following scheme:

| 3.0 ml | at the | 10$^{th}$ minute |
|---|---|---|
| 3.5 ml | at the | 25$^{th}$ minute |
| 3.5 ml | at the | 40$^{th}$ minute |

The overall ETA/Ni molar ratio was 150. A total of 173 g of polymer was obtained, in the form of free-flowing spheroid particles, containing 59 wt % of ethylene polymer. A total of 103 g of ethylene polymer were produced, corresponding to an activity of 518 kg PE/g Ni. Polymerization data are summarized in Table 5.

Comparative Example 12

The procedure described in Example 34 was repeated with the only difference that no n-BPCC was added during the polymerization run. A total of 145 g of polymer composition was obtained, in the form of free-flowing spheroid particles, containing 52 wt % of ethylene polymer. A total of 75 g of ethylene polymer was produced, corresponding to an activity of 357 kg PE/g Ni. Polymerization data are summarized in Table 5.

EXAMPLE 36

The procedure described in Example 34 was repeated with the difference that only 26 g of porous polypropylene (instead of 70 g) and 6.48 mg (0.010 mmol) of (IV) (instead of 2.16 mg) were introduced into the reactor. The Al/Ni molar ratio was still 100 in the precontact solution. MMAO (10.2 ml) was used to scavenge liquid propane, instead of 6.8 mmol. n-BPCC solution (0.05 M in n-heptane) was injected according to the following scheme:

| 3.0 ml | at the | 20$^{th}$ minute |
|---|---|---|
| 3.5 ml | at the | 40$^{th}$ minute |
| 3.5 ml | at the | 60$^{th}$ minute |

The overall n-BPCC/Ni molar ratio was 50. A total of 147 g of polymer was obtained in the form of free-flowing spheroid particles, containing 82.3 wt % of ethylene polymer. A total of 121 g of ethylene polymer was produced, corresponding to an activity of 203 kg PE/g Ni. The PE had Tm=129° C. (experimental) and I.V.=1.86 dl/g (calculated). Polymerization data are summarized in Table 5.

Comparative Example 13

The procedure described in Example 36 was repeated with the only difference that n-BPCC was added during the polymerization run. A total of 70 g of polymer was obtained in the form of free-flowing spheroid particles, containing 62.9 wt % of ethylene polymer. A total of 44 g of ethylene polymer was produced, corresponding to an activity of 74 kg PE/g Ni. Polymerization data are summarized in Table 5.

EXAMPLE 37

The procedure described in Example 36 was repeated with the only difference that the polymerization temperature was 70° C. instead of 60° C. n-BPCC solution (0.05 M in n-heptane) was injected according to the following scheme:

| | | |
|---|---|---|
| 3.0 ml | at the | 5th minute |
| 3.5 ml | at the | 15th minute |
| 3.5 ml | at the | 30th minute |

The overall n-BPCC/Ni molar ratio was 150. A total of 189 g of polymer was obtained, in the form of free-flowing spheroid particles, containing 63 wt % of ethylene polymer. A total of 119 g of ethylene polymer was produced, corresponding to an activity of 598 kg PE/g Ni. Polymerization data are summarized in Table 5.

Comparative Example 14

The procedure described in Example 37 was repeated with the only difference that no n-BPCC was added during the polymerization run. A total of 100 g of polymer was obtained, in the form of free-flowing spheroid particles, containing 31 wt % of ethylene polymer. A total of 31 g of ethylene polymer was produced, corresponding to an activity of 156 kg PE/g Ni. The PE had a Tm=126° C. (experimental) and I.V.=3.41 dl/g (calculated). Polymerization data are summarized in Table 5.

EXAMPLE 38

The procedure described in Example 34 was repeated with the only difference that 1,3-dichloro-1,3-diisobutylaluminoxane (IBCAO) was used as the cocatalyst, instead of MMAO. n-BPCC solution (0.017 M in n-heptane) was injected according to the following scheme:

| | | |
|---|---|---|
| 3.0 ml | at the | 15th minute |
| 3.5 ml | at the | 30th minute |
| 3.5 ml | at the | 50th minute |

The overall n-BPCC/Ni molar ratio was 50. A total of 160 g of polymer as obtained, in the form of free-flowing spheroid particles, containing 56 wt % of ethylene polymer. A total of 90 g of ethylene polymer was produced, corresponding to an activity of 452 kg PE/g Ni. Polymerization data are summarized in Table 5.

Comparative Example 15

The procedure described in Example 38 was repeated with the only difference that no n-BPCC was added during the polymerization run. A total of 130 g of polymer was obtained, in the form of free-flowing spheroid particles, containing 45 wt % of ethylene polymer. At total of 59 g of ethylene polymer was produced, corresponding to an activity of 296 kg PE/g Ni. Polymerization data are summarized in Table 5.

EXAMPLE 39

The procedure described in Example 34 was repeated with the only difference that (III)was used instead of (IV) and the polymerization temperature was 50° C., instead of 60° C. n-BPCC solution (0.05 M in n-heptane) was injected according to the following scheme:

| | | |
|---|---|---|
| 3.0 ml | at the | 5th minute |
| 3.5 ml | at the | 15th minute |
| 3.5 ml | at the | 30th minute |

The overall n-BPCC/Ni molar ratio was 150. A total of 222 g of polymer was obtained in the form of free-flowing spheroid particles, containing 68 wt % of ethylene polymer. A total of 152 g of ethylene polymer was produced, corresponding to an activity of 762 kg PE/g Ni. Polymerization data are summarized in Table 5.

Comparative Example 16

The procedure described in Example 39 was repeated with the only difference that no n-BPCC was added during the polymerization run. A total of 124 g of polymer was obtained in the form of free-flowing spheroid particles, containing 43.5 wt % of ethylene polymer. A total of 54 g of ethylene polymer was produced, corresponding to an activity of 271 kg PE/g Ni, having Tm =128° C. (experimental) and I.V.=5.63 dl/g calculated). Polymerization data are summarized in Table 5.

TABLE 5

| Example | [Ni] (ppm)* | Additive/Ni (mol/mol) | time of injection (min) | T (° C.) | t (h) | Activity (kg PE/g Ni) |
|---|---|---|---|---|---|---|
| 33 | 2.7 | 68 | 18, 45, 75, 180 | 60 | 4 | 890 |
| 34 | 2.7 | 150 | 10, 25, 40 | 60 | 2 | 827 |
| 35 | 2.7 | 150 | 10, 25, 40 | 60 | 2 | 518 |
| CE12 | 2.7 | = | = | 60 | 2 | 377 |
| 36 | 23 | 50 | 20, 40, 60 | 60 | 2 | 203 |
| CE13 | 23 | = | = | 60 | 2 | 74 |
| 37 | 2.7 | 150 | 5, 15, 30 | 70 | 2 | 598 |
| CE14 | 2.7 | = | = | 70 | 2 | 156 |
| 38 | 2.7 | 50 | 15, 30, 50 | 60 | 2 | 450 |
| CE15 | 2.7 | = | = | 60 | 2 | 300 |
| 39 | 2.8 | 150 | 5, 15, 30 | 50 | 2 | 762 |
| CE16 | 2.8 | = | = | 50 | 2 | 271 |

*ppm of the Ni complex

EXAMPLES 40–42

Comparative Example 17

Catalyst Preparation

The supported catalyst was made by contacting a toluene solution of 41.3 mg of (III) with 1.0 g silica supported methylalumoxane containing a nominal aluminum content of 14 weight percent (Albermarle Corp., Baton Rouge, La. USA). The resulting suspension was decanted and dry pentane was added. This suspension was also decanted and a second addition of pentane was made. After a final decaning, the solids were dried under vacuum. Assuming all of (III) became attached to the silica, the catalyst contained 3.7 μg/mg of supported catalyst composition.

EXAMPLE 40

A solution of 69.3 mg α,α,α-trichlorotoluene was made up in 236 mL dry toluene and transferred to a high-pressure liquid chromatography pump. A 500-mL stirred autoclave was fitted with addition tubes, one containing 152±1 mg of silica-supported methylalumoxane as solvent scavenger suspended in 3 ml dry toluene, and the other containing 112 mg of the supported catalyst suspended in 2 ml of dry cyclohexane.

The autoclave was loaded with 250 mL dry cyclohexane. The scavenger was pressure-transferred into the solvent and the pressure vented to zero. The stirrer was started and the autoclave heated to 60° C. The solvent was saturated with ethylene by stirring at 1.38 MPa/60° C. for 2 min. The catalyst was pressure-injected into the autoclave to initiate polymerization. After 1 min, pumping of the trichlorotoluene solution was begun at 0.64 mL/min via a feed line through one of the autoclave head ports. Temperature was maintained at 60° C. for 120 min as ethylene polymerized. The trichlorotoluene feed was then stopped and the autoclave was vented. The polymer suspension was filtered, rinsed with acetone and the resulting powder was oven-dried to yield 74.3 g polyethylene powder. Productivity was about 179 kg PE/g Ni.

Comparative Example 17

The procedure of Example 40 was followed, except that 100.1 mg of supported catalyst was used, and trichlorotoluene solution was pumped during the polymerization. After a 2 h polymerization time, the suspension was filtered, rinsed and dried to yield 16.2 g of polymer. This control example with no added trichlorotoluene shows the great improvement afforded by addition of the oxidant to the polymerization described in Example 40. Productivity was about 44 kg PE/g Ni.

EXAMPLE 41

The procedure of Example 40 was followed, except the prepared solution contained 29.6 g of ethyl trichloroacetate in 104 ml toluene. Also, 51 mg of the supported catalyst was charged and after 1 min, and the pumping rate of the ethyl trichloroacetate solution was 0.62 ml/min. After a 2 h polymerization time, the polymer suspension was filtered and rinsed. The resulting powder was oven-dried to yield 17.3 g polyethylene powder. Productivity was about 92 kg PE/g Ni.

EXAMPLE 42

The procedure of Example 40 was followed, except the prepared solution contained 22.7 g 1,2-dibromoethane in 79 ml toluene. Also, 53 mg of the supported catalyst was charged and the pumping rate of dibromoethane solution was 0.61 ml/min. After a 2 h polymerization, 10.9 g of dried polyethylene was isolated. Productivity was about 56 kg PE/g Ni.

What is claimed is:

1. A process for the polymerization of an olefin, comprising the step of contacting, under polymerization conditions, said olefin with an olefin coordination polymerization catalyst comprising a complex of a Group 8 to Group 10 metal, and a cocatalyst, wherein an oxidizing agent is present during at least a portion of said contacting.

2. The process of claim 1, wherein the metal is selected from the group consisting of Ni, Pd, Fe and Co.

3. The process of claim 2, wherein the metal is Ni.

4. The process of claim 1, wherein the catalyst comprises a complex of the metal with an organic ligand of the formula (I)

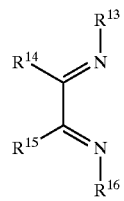

wherein:
$R^{13}$ and $R^{16}$ are each independently hydrocarbyl or substituted hydrocarbyl, provided that the atom bound to the imino nitrogen atom has at least two carbon atoms bound to it, and $R^{14}$ and $R^{15}$ are each independently hydrogen, hydrocarbyl, substituted hydrocarbyl, or $R^{14}$ and $R^{15}$ taken together are hydrocarbylene or substituted hydrocarbylene to form a carbocyclic ring.

5. The process of claim 1, wherein the oxidizing agent is added essentially continuously during said process.

6. The process of claim 1, wherein said oxidizing agent is selected from the group consisting of iodine and an active halocarbon.

7. The process of claim 1, wherein said oxidizing agent is iodine.

8. The process of claim 1, wherein said oxidizing agent is

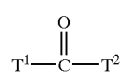

wherein:
$T^1$ is a hydrocarbyl or substituted hydrocarbyl group containing at least one halogen bonded to a carbon atom;
$T^2$ is hydrogen, hydrocarbyl, substituted hydrocarbyl or a functional group, optionally containing one or more halogen bonded to a carbon atom.

9. The process of claim 1, wherein said oxidizing agent is

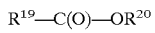

wherein:
$R^{19}$ is selected from the group consisting of hydrocarbyl and substituted hydrocarbyl wherein at least one hydrogen atom bonded to a carbon atom is replaced with a halogen atom; and
$R^{20}$ is selected from the group consisting of $R^{19}$, hydrocarbyl and substituted hydrocarbyl.

10. The process of claim 1, wherein said oxidizing agent is trichlorotoluene.

11. The process of claim 6, wherein the catalyst comprises a complex of the metal with an organic ligand of the formula (I)

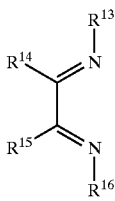 (I)

wherein:
R[13] and R[16] are each independently hydrocarbyl or substituted hydrocarbyl, provided that the atom bound to the imino nitrogen atom has at least two carbon atoms bound to it, and R[14] and R[15] are each independently hydrogen, hydrocarbyl, substituted hydrocarbyl, or R[14] and R[15] taken together are hydrocarbylene or substituted hydrocarbylene to form a carbocyclic ring.

12. The process of claim 11, wherein the metal is Ni.

13. A process for the polymerization of an olefin, comprising the step of contacting under polymerization conditions, said olefin with an olefin coordination polymerization catalyst comprising a complex of a Group 8 to Group 10 metal, wherein an oxidizing agent is added essentially continuously during said process.

14. The process of claim 13, wherein the metal is selected from the group consisting of Ni, Pd, Fe and Co.

15. The process of claim 14, wherein the metal is Ni.

16. The process of claim 13, wherein the catalyst comprises a complex of the metal with an organic ligand of the formula (I)

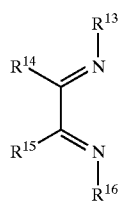 (I)

wherein:
R[13] and R[16] are each independently hydrocarbyl or substituted hydrocarbyl, provided that the atom bound to the imino nitrogen atom has at least two carbon atoms bound to it, and R[14] and R[15] are each independently hydrogen, hydrocarbyl, substituted hydrocarbyl, or R[14] and R[15] taken together are hydrocarbylene or substituted hydrocarbylene to form a carbocyclic ring.

17. The process of claim 13, wherein said oxidizing agent is selected from the group consisting of iodine and an active halocarbon.

18. The process of claim 13, wherein said oxidizing agent is iodine.

19. The process of claim 13, wherein said oxidizing agent is

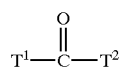 (V)

wherein:
T[1] is a hydrocarbyl or substituted hydrocarbyl group containing at least one halogen bonded to a carbon atom;

T[2] is hydrogen, hydrocarbyl, substituted hydrocarbyl or a functional group, optionally containing one or more halogen bonded to a carbon atom.

20. The process of claim 13, wherein said oxidizing agent is

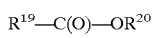

$R^{19}$—C(O)—$OR^{20}$ (VI)

wherein:
R[19] is selected from the group consisting of hydrocarbyl and substituted hydrocarbyl wherein at least one hydrogen atom bonded to a carbon atom is replaced with a halogen atom; and R[20] is selected from the group consisting of R[19], hydrocarbyl and substituted hydrocarbyl.

21. The process of claim 13, wherein said oxidizing agent is trichlorotoluene.

22. The process of claim 17, wherein the catalyst comprises a complex of the metal with an organic ligand of the formula (I)

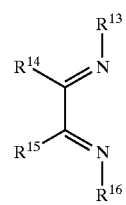 (I)

wherein:
R[13] and R[16] are each independently hydrocarbyl or substituted hydrocarbyl, provided that the atom bound to the imino nitrogen atom has at least two carbon atoms bound to it, and R[14] and R[15] are each independently hydrogen, hydrocarbyl, substituted hydrocarbyl, or R[14] and R[15] taken together are hydrocarbylene or substituted hydrocarbylene to form a carbocyclic ring.

23. The process of claim 22, wherein the metal is Ni.

24. A process for the polymerization of an olefin comprising a monomer selected from the group consisting of ethylene, propylene and an α-olefin of the formula $R^2CH{=}CH_2$, wherein R[2] is n-alkyl containing 2 to about 20 carbon atoms, said process comprising the step of contacting, under polymerization conditions, said olefin with an olefin coordination polymerization catalyst comprising a complex of a Group 8 to Group 10 metal, wherein an oxidizing agent is present during at least a portion of said contacting.

25. The process of claim 24, wherein the metal is selected from the group consisting of Ni, Pd, Fe and Co.

26. The process of claim 25, wherein the metal is Ni.

27. The process of claim 24, wherein the catalyst comprises a complex of the metal with an organic ligand of the formula (I)

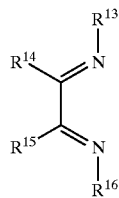
(I)

wherein:
R$^{13}$ and R$^{16}$ are each independently hydrocarbyl or substituted hydrocarbyl, provided that the atom bound to the imino nitrogen atom has at least two carbon atoms bound to it, and R$^{14}$ and R$^{15}$ are each independently hydrogen, hydrocarbyl, substituted hydrocarbyl, or R$^{14}$ and R$^{15}$ taken together are hydrocarbylene or substituted hydrocarbylene to form a carbocyclic ring.

28. The process of claim 24, wherein a cocatalyst is present.

29. The process of claim 24, wherein the oxidizing agent is added essentially continuously during said process.

30. The process of claim 24, wherein said oxidizing agent is selected from the group consisting of iodine and an active halocarbon.

31. The process of claim 24, wherein said oxidizing agent is iodine.

32. The process of claim 24, wherein said oxidizing agent is

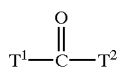
(V)

wherein:
T$^1$ is a hydrocarbyl or substituted hydrocarbyl group containing at least one halogen bonded to a carbon atom;
T$^2$ is hydrogen, hydrocarbyl, substituted hydrocarbyl or a functional group, optionally containing one or more halogen bonded to a carbon atom.

33. The process of claim 24, wherein said oxidizing agent is $$R^{19}\text{—}C(O)\text{—}OR^{20} \qquad (VI)$$

wherein:
R$^{19}$ is selected from the group consisting of hydrocarbyl or substituted hydrocarbyl wherein at least one hydrogen atom bonded to a carbon atom is replaced with a halogen atom; and
R$^{20}$ is selected from the group consisting of R$^{19}$ or hydrocarbyl of substituted hydrocarbyl.

34. The process of claim 24, wherein said oxidizing agent is trichlorotoluene.

35. The process of claim 30, wherein the catalyst comprises a complex of the metal with an organic ligand of the formula (I)

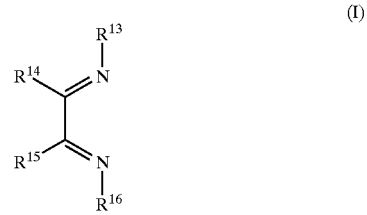
(I)

wherein:
R$^{13}$ and R$^{16}$ are each independently hydrocarbyl or substituted hydrocarbyl, provided that the atom bound to the imino nitrogen atom has at least two carbon atoms bound to it, and R$^{14}$ and R$^{15}$ are each independently hydrogen, hydrocarbyl, substituted hydrocarbyl, or R$^{14}$ and R$^{15}$ taken together are hydrocarbylene or substituted hydrocarbylene to form a carbocyclic ring.

36. The process of claim 35, wherein a cocatalyst is present.

37. The process of claim 35, wherein the oxidizing agent is added essentially continuously during said process.

38. The process of claim 35, wherein the metal is Ni.

* * * * *